United States Patent
Singhal et al.

(10) Patent No.: US 9,621,626 B2
(45) Date of Patent: Apr. 11, 2017

(54) DYNAMICALLY UPDATING WEBSITE CONTENT OR WEB SERVICE VIA TEXT MESSAGING

(71) Applicants: Go Daddy Operating Company, LLC, Scottsdale, AZ (US); Go Daddy India Domains and Hosting Services Private Limited, Secunderabad, Andhra Pradesh (IN)

(72) Inventors: Anurup Singhal, Gurgaon (IN); Arnold Blinn, Hunts Point, WA (US); Guy Ellis, Scottsdale, AZ (US); Judd Jacobs, San Jose, CA (US)

(73) Assignees: Go Daddy Operating Company, LLC, Scottsdale, AZ (US); Go Daddy India Domains and Hosting Services Private Limited, Andhra Pradesh (IN)

( * ) Notice: Subject to any disclaimer, the term of this patent is extended or adjusted under 35 U.S.C. 154(b) by 134 days.

(21) Appl. No.: 14/284,322

(22) Filed: May 21, 2014

(65) Prior Publication Data
US 2015/0341415 A1  Nov. 26, 2015

(51) Int. Cl.
*H04W 4/14* (2009.01)
*H04L 29/08* (2006.01)
*H04W 4/00* (2009.01)

(52) U.S. Cl.
CPC ........... *H04L 67/025* (2013.01); *H04W 4/001* (2013.01); *H04W 4/14* (2013.01); *H04L 67/10* (2013.01)

(58) Field of Classification Search
CPC ............................. H04L 67/02; G06Q 30/06
See application file for complete search history.

(56) References Cited

U.S. PATENT DOCUMENTS

| 6,263,352 B1 | 7/2001 | Cohen |
| 6,313,835 B1 | 11/2001 | Gever et al. |
| 6,601,057 B1 | 7/2003 | Underwood et al. |

(Continued)

OTHER PUBLICATIONS

Review of Personalization Technologies: Collaborative Filtering vs. ChoiceStream's Attributized Bayesian Choice Modeling. ChoiceStream. http://www.choicestream.com/pdf/ChoiceStream_TechBrief.pdf. Apr. 2004.

(Continued)

*Primary Examiner* — Philip Chea
*Assistant Examiner* — Wuji Chen
(74) *Attorney, Agent, or Firm* — Quarles & Brady LLP

(57) ABSTRACT

A method is disclosed for dynamically updating the content of a website or a web service via a text message. A text service may receive, at a text phone number, the text message sent by a user from a text device. The text device may have a user phone number. In preferred embodiments, the text service may have a plurality of text phone numbers that may be called by a plurality of users. The text service may produce an action code based, at least in part, on the text message, the text phone number called by the user, the user phone number or some combination thereof. The text service may transmit the action code to one or more hosting servers to alter a website which may then be published. In another embodiment, the text service may transmit the action code to web server(s) that may alter a web service for the user.

23 Claims, 5 Drawing Sheets

(56) References Cited

U.S. PATENT DOCUMENTS

| | | | |
|---|---|---|---|
| 6,697,825 B1 | 2/2004 | Underwood et al. | |
| 7,111,229 B2 | 9/2006 | Nicholas et al. | |
| 7,152,207 B1 | 12/2006 | Underwood et al. | |
| 7,668,913 B1 | 2/2010 | Underwood et al. | |
| 7,680,901 B2 | 3/2010 | Rechterman et al. | |
| 7,770,122 B1 | 8/2010 | Shaik | |
| 7,886,221 B1 | 2/2011 | Underwood et al. | |
| 8,136,027 B2 | 3/2012 | Underwood et al. | |
| 8,595,300 B2 | 11/2013 | Underwood et al. | |
| 8,677,234 B2 | 3/2014 | Underwood et al. | |
| 2003/0220979 A1* | 11/2003 | Hejl | H04M 3/5322 709/206 |
| 2004/0132431 A1* | 7/2004 | Vandermeijden | G06F 17/30887 455/412.2 |
| 2004/0249978 A1 | 12/2004 | Marappan et al. | |
| 2006/0094454 A1* | 5/2006 | Kim | G06Q 10/107 455/466 |
| 2006/0174199 A1 | 8/2006 | Soltis et al. | |
| 2006/0200751 A1 | 9/2006 | Underwood et al. | |
| 2007/0011248 A1* | 1/2007 | Kalervo | G06F 17/3089 709/206 |
| 2007/0157018 A1* | 7/2007 | Simon | H04M 11/04 713/100 |
| 2007/0300057 A1* | 12/2007 | Corcoran | G06F 21/34 713/154 |
| 2008/0227435 A1* | 9/2008 | Six | H04L 67/02 455/414.1 |
| 2008/0270418 A1* | 10/2008 | Chen | G06Q 10/10 |
| 2009/0216577 A1 | 8/2009 | Killebrew | |
| 2009/0287701 A1* | 11/2009 | Breaker | G06F 17/3089 |
| 2011/0060793 A1* | 3/2011 | Wheeler | G06Q 10/00 709/203 |
| 2012/0221657 A1* | 8/2012 | Zeevi | G06F 9/54 709/206 |
| 2014/0250198 A1* | 9/2014 | Jorasch | H04L 51/18 709/206 |

OTHER PUBLICATIONS

Website Personalization: An Empirical Study of Novice and Expert Users on MyYahoo.com. http://www.doug-info.com/papers/personalization.htm. Fall 2000.

Personalization is Over-Rated. http://www.useit.com/alertbox/981004.html. Oct. 4, 1998.

Novice vs. Expert Users. http://www.useit.com/alertbox/20000206.htm. Feb. 6, 2000.

Intranet Portals: A Tool Metaphor for Corporate Information. http://www.useit.com/alertbox/20030331.html. Mar. 31, 2003.

The personalization story. ITworld.com. http://www.itworld.com/Man/2676/ITW010511rosenberg/pfindex.html. May 11, 2001.

* cited by examiner

DYNAMICALLY UPDATING WEBSITE CONTENT OR WEB SERVICE VIA TEXT MESSAGING

FIELD OF THE INVENTION

The present invention generally relates to the field of updating the content of a website or web services via text messaging.

SUMMARY OF THE INVENTION

The present invention may provide methods for a user to update any service backend command using a text message, such as the user's website content or the user's web service(s) by transmitting a text message to a web service provider or updating inventory details in a product database.

The web service provider may have a text service to receive the text message at a text phone number. In preferred embodiments, the text service has a plurality of text phone numbers that may be called by the user using a text device. In these embodiments, the text service may produce different action codes based on which text phone number was called. The text device may be, as a non-limiting example, a cell phone having a user phone number.

The text service may produce an action code based, at least in part, on the text message, the text phone number called, the user phone number or some combination thereof. The text service may determine the user, the user's account, the user's services or the user's website associated with the text message based on the user phone number or the text message.

The text service may transmit the action code, through one or more hosting servers, to the user's website. In preferred embodiments, the user's website includes a plugin that may receive the action code and the plugin may alter the website in some manner (such as altering the website code or changing the template for the website) based on the received action code.

The altered website is preferably published without the user taking any action other than sending the original text message. In another embodiment, the user may be allowed to confirm any alterations made to the website before publishing the altered website.

In another embodiment, two users (using deferent text devices having different user phone numbers) may send text messages (the same or different) to the same text phone number in the text service, but the text service may produce different action codes based on the different user phone numbers. In other words, the action codes may be based on the text message in combination with the different user phone numbers.

In the same embodiment or in a different embodiment, the same user (using a single text device) may send text messages (the same or different) to two different text phone numbers, in a plurality of text phone numbers, to produce two different action codes. As another example, the same user may send two different text messages to the same text phone number, in a plurality of text phone numbers to produce two different action codes. In other words, the action codes may be based on the text message in combination with the different text phone numbers called by the user.

As described before, the text service may determine the user, user's account, user's services or user's website based on the user phone number and/or text message and/or message content and then transmit the action code(s) to one or more hosting servers hosting the user's website or services (even running a script). The user's website may be one out of a plurality of different websites hosted by the hosting server(s) and may have a plugin that alters the user's website based on the action code. The user's altered website may be published, either with or without further action or confirmation from the user.

In another embodiment, a user may alter a web service via a text message. In this embodiment, a text service, running on one or more hardware servers, may receive over a network a text message sent to a text phone number from a text device by a user. The text device may have a user phone number.

The text service may produce an action code based on the text message, the user phone number, the text phone number or some combination thereof.

The text service may determine the user, user's account, user's web services or other identification information based on the user phone number and/or the text message. The text service may transmit the action code to, as a non-limiting example, an exposed API on one or more web servers and the one or more web servers may alter, possibly through the use of a plugin or other code, one or more of the user's web services.

The above features and advantages of the present invention will be better understood from the following detailed description taken in conjunction with the accompanying drawings.

DETAILED DESCRIPTION

Figure 1:
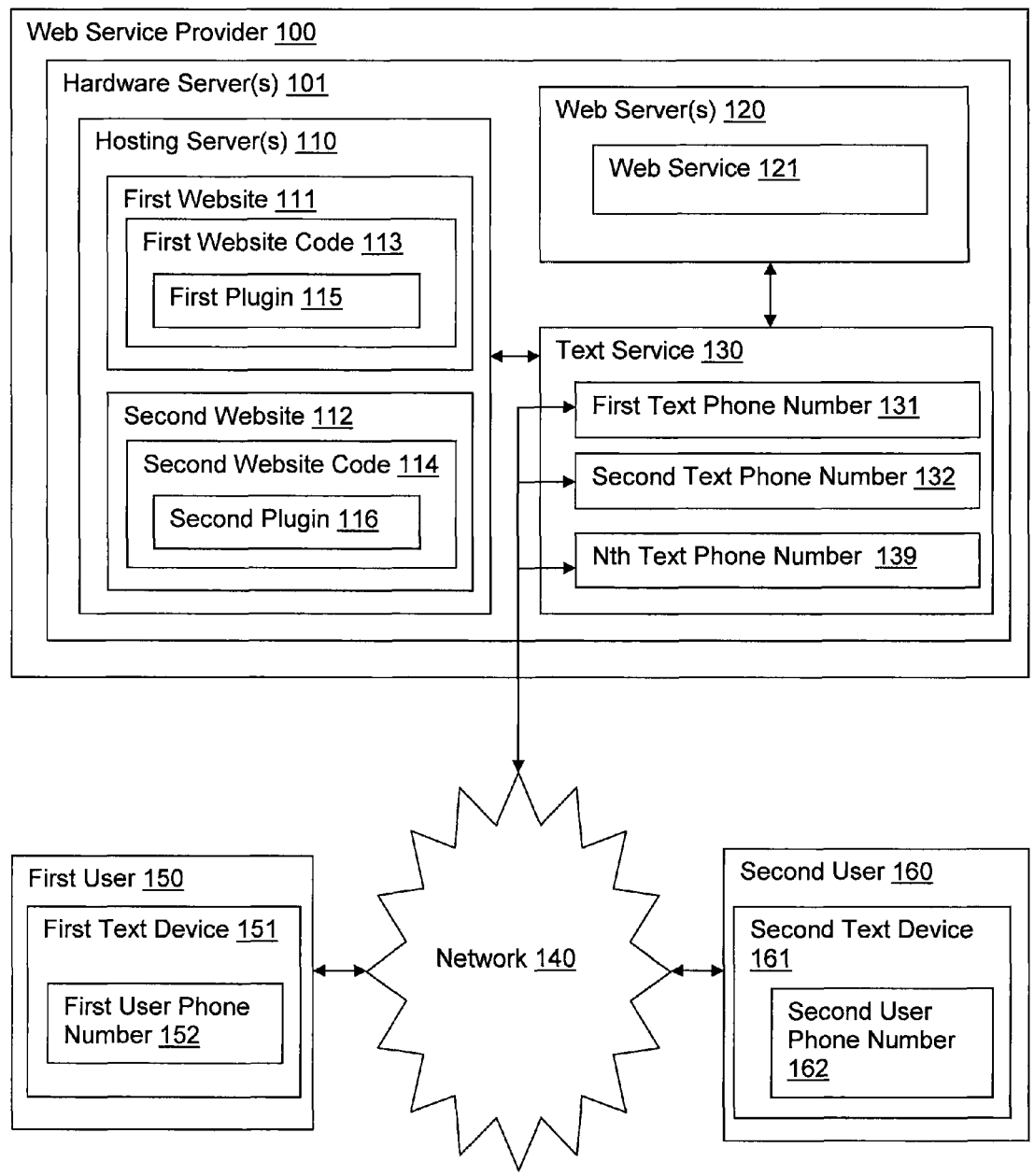
FIG. 1 is a block diagram of a system that may be used to practice the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. Network 140 is a collection of links and nodes (e.g., multiple computers and/or other devices connected together) arranged so that information may be passed from one part of the network 140 to another over multiple links and through various nodes. Examples of networks 140 include the Internet, the public switched telephone network, the global Telex network, computer networks (e.g., an intranet, an extranet, a local-area network, or a wide-area network), wired networks, wireless networks, cell phone networks and/or combinations thereof.

The Internet is a worldwide network of computers and computer networks arranged to allow the easy and robust exchange of information between people on clients running browsers. Hundreds of millions of people around the world have access to computers connected to the Internet via Internet Service Providers (ISPs).

Content providers place multimedia information (e.g., text, graphics, audio, video, animation, and other forms of data) at specific locations on the Internet referred to as websites 111, 112. The combination of all the websites 111, 112 and their corresponding web pages on the Internet is generally known as the World Wide Web (WWW) or simply the Web.

For Internet users and online businesses, the Internet continues to be increasingly valuable. People use the Internet for everyday tasks, from social networking, shopping, banking, and paying bills to consuming media and entertainment. E-commerce is growing, with businesses delivering more services and content across the Internet, communicating and collaborating online, and inventing new ways to connect with each other. Each online business may have one or more websites and many online businesses will also have a brick-and-mortar presence.

Prevalent on the Internet are websites 111, 112 which offer and sell goods and services to individuals and organizations. The websites 111, 112 may consist of a single webpage, but typically consist of multiple interconnected and related webpages. Websites 111, 112, unless very large and complex or have unusual traffic demands, may typically reside on a single hardware server 101 and are prepared and maintained by a single individual or entity (although websites 111, 112 residing on multiple hardware servers 101 are certainly possible). Menus, links, tabs, etc. may be used to move between different web pages within a website 111, 112 or to move to a different website 111, 112 altogether.

Websites 111, 112 may be created using website code 113, 114, which may comprise HyperText Markup Language (HTML) to generate a standard set of tags that define how the webpages for the websites 111, 112 are to be displayed.

Users of the Internet may access online businesses' websites 111, 112 using software known as an Internet browser, such as MICROSOFT INTERNET EXPLORER, MOZILLA FIREFOX or GOGGLE CHROME. After the browser has located the desired webpage, the browser may request and receive information from the website 111, 112, typically in the form of an HTML document, and then display the website content for the user. The user may then view other webpages at the same website 111, 112 or move to an entirely different website 111, 112 using the browser 102.

For purposes of this specification and claims, a plugin 115, 116 is defined as a software component (including a widget) that adds a specific feature to an existing software application. A plug-in 115, 116 thus defined for the present invention may be able to receive an action code from a text service 130 and alter a website 111, 112 based on the action code. In other embodiments, an exposed API may be able to receive the action code from the text service 130 and alter the website 111, 112 or a web service 121 based on the action code. As non-limiting examples, the action code may be used for blogging, advertising a special offer or scheme, updating content, updating a price, updating inventory or any other change or alteration that is normally permitted on a website 111, 121 as part of the administration of a website 111, 121 or altering or administering a web service 121.

The websites 111, 121 may be hosted or operated by hosting server(s) 110 providing hosting services. The hosting server(s) 110 may be, as non-limiting examples, one or more Dell PowerEdge(s) rack server(s), HP Blade Server(s), or IBM Rack or Tower server(s), although other types or combination of servers may also be used. The hosting server(s) 110 may provide the electronic hardware to run computer programs that may be written to perform various functions and processes.

Some online businesses, typically those that are larger and more sophisticated, may provide their own hardware, software, and connections to the Internet to operate their own websites 111, 112. But many online businesses either do not have the resources available or do not want to create and maintain the infrastructure necessary to host their own websites 111, 112. To assist such online businesses, web service providers 100 exist that offer website hosting services. These hosting providers typically provide the hardware, software, and electronic communication equipment necessary to connect multiple websites 111, 112 to the Internet. A single web service provider 100 may literally host thousands of websites 111, 112 on one or more hardware servers 101.

A web service provider 100 may use hardware server(s) 101, software, routers, communication equipment, etc. to perform various web applications and services, possibly running in the cloud. Non-limiting examples of web services include domain name searches, domain name registration, domain name transfers, domain name auctions and domain name management, purchasing, managing and installing SSL certificates and social networking. Any other web service, now known or developed in the future, may also be altered based on an action code.

Unfortunately, not every user 150, 160 has easy access to the Internet which typically requires an Internet Service Provider (ISP) and an Internet capable device. However, some users 150, 160 that may not have access to the Internet, may still be able to send text messages from a text device 151, 161.

Text messaging, or texting, may comprise the act of composing and sending a brief, electronic message between two or more text devices 151, 161, such as mobile phones, or fixed or portable devices over a network 140. Text messaging may refer, for example, to messages sent using the Short Message Service (SMS). It may also refer to messages containing image, video, and sound content (such as Multimedia Messaging Service (MMS) messages). MMS is a standard way to send messages that include multimedia content to and from mobile phones. This allows one or more images to also convey information in a manner similar to the text message. MMS extends the core capability of SMS that allowed exchange of text messages only up to 160 characters in length. The sender of a text message may be known as a user 150, 160 or texter.

The text messages of the present invention may be sent by any known or later developed protocol. In a preferred embodiment, the text messages are sent in the SMS or MMS protocol although other text message protocols may also be used. SMS is a text messaging service component of phone, Web, or mobile communication systems. SMS uses standardized communication protocols to allow fixed line or mobile phone devices to exchange short text messages. Though most SMS messages are mobile-to-mobile text messages, support for the service has expanded to include other mobile technologies, such as ANSI CDMA networks and Digital AMPS, as well as satellite and landline networks.

A users 150, 160 of the invention may have access to a text device 151, 161. The text device 151, 161 typically will be a cell phone, but may be any device with text capability. The text device 151, 161 may have a user phone number 152, 162. The user 150, 160 will typically be an owner, the owner's agent, or another person associated with a website or application 111, 112 hosted on the one or more hosting servers 110.

The text service 130 may comprise one or more hardware servers that comprise servers and telecommunication equipment able to receive and route text messages sent to one or more text phone numbers 131-139. The text phone numbers 131-139 may be called by a plurality of users 150, 160 from a plurality of text devices 151, 161 over a network 140. Each text device 151, 161 may have a user phone number 152, 162. The text service 130 may operate on one or more hardware servers 101 that provide a platform for one or more software packages. The software packages may perform the various functions herein described for the text service 130. The software packages may be written in any software language.

The text service 130 is preferably able to receive a text message, determine the user phone number 152, 162 from the text device 151, 161 that called the text service 130 and determine which text phone number 131, 132, 139 received the call from the user 150, 160. The text service 130 may also be able to determine a particular website 111, 121 out of a plurality of websites or a web service 121 that the text message is intended for based on the user phone number 152, 162 and/or the text message. In some embodiments, the text message may include an account identification and/or a password The text service 130 may be able to produce an action code based on the text message, the text phone number 131, 132, 139 called, the user phone number 152, 162 or some combination thereof. The action code may be the same as the text message, or may be formatted by the text service 130 for easier consumption by a plugin 115, 116 associated with the website 111, 112 or a web service 121.

The action code may comprise one or more commands (such as change price) and/or one or more parameters (such as the new price). Action codes may include user/business specific information (such as an update to one or more promotions) or may be generic (such as shutdown). Action codes may be used to update a store front. Action codes may be an alpha-numeric character string. As a specific, non-limiting example, the action code may be "update price item A, $3.00". In this example, the "update price item A," may be a command and the "$3.00" may be a parameter.

Action codes may be executed immediately upon receipt. In other embodiments, action codes may be scheduled to be executed at a particular time, queued up based on a priority system (such as the order the action code was received) and/or the action codes may be rolled back.

In another embodiment, an action code may comprise a query that causes a website 111, 112, a plugin 115, 116 or a web service 121 to send a text message back to the user 150, 160 on the text device 151, 161 in response to the query. As non-limiting examples, the action code may pull data by sending an action code that requests which promotion is currently being listed or that requests how many unique visitors visited the website 111, 112 today. An action code may be a predetermined alpha numeric string used to represent any query desired by the user 150, 160 for the website 111, 112 or web service 121.

Figure 2:
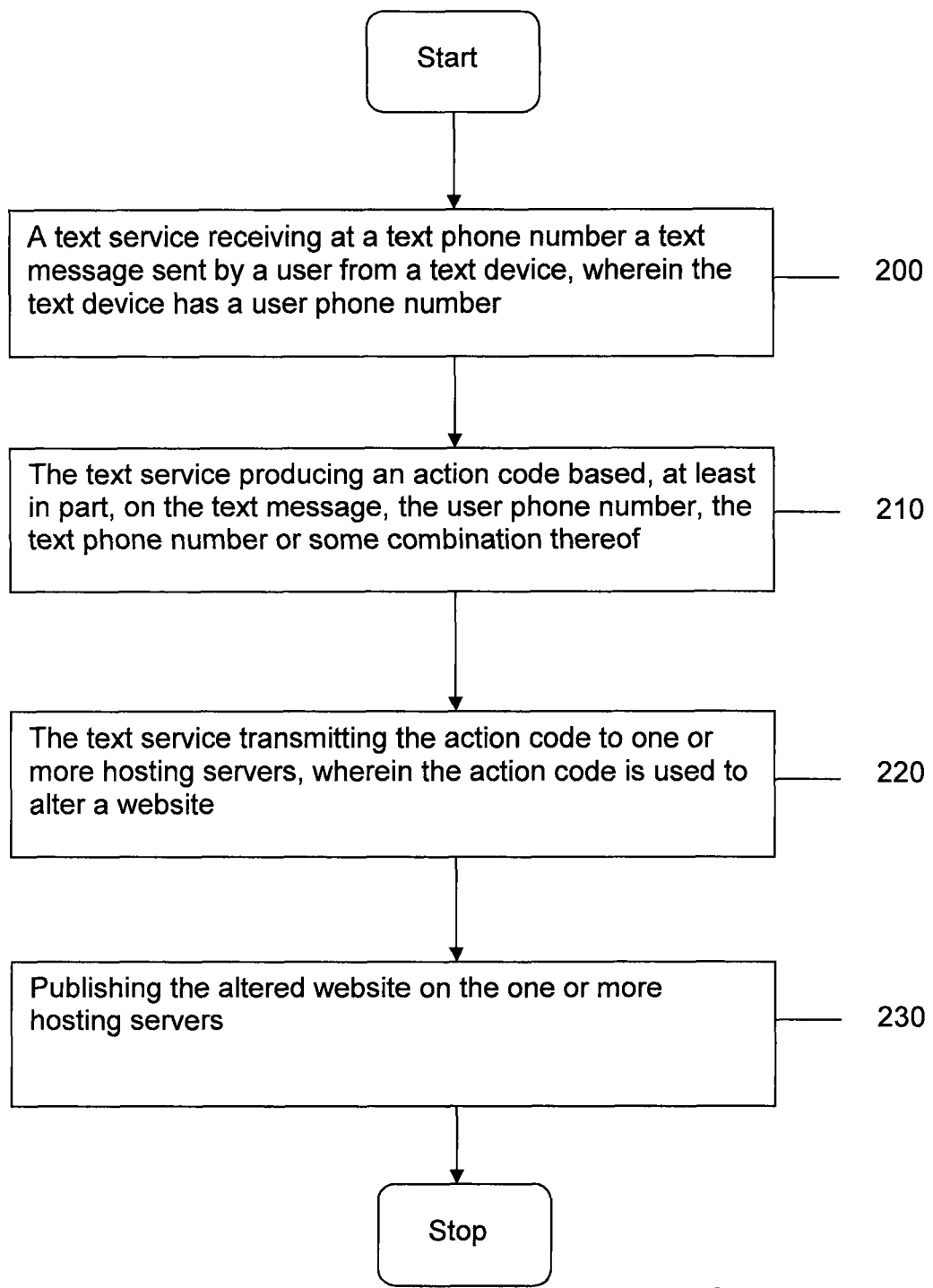
FIG. 2 is a flow diagram illustrating a first embodiment of a user modifying a website based on a text message sent to a text service.

FIG. 2 illustrates a possible method for practicing the invention. A text service 130 may receive over a network 140 (such as a cell phone network) a text message sent to a text phone number 131, 132, 139 from a text device 151 by a first user 150. The text device 151 preferably has a first user phone number 152. (Step 200) The text service 130 may determine a website 111, from a plurality of websites 111, 112, that is intended to be altered by the text message based on the user phone number 152.

The text service 130 may produce an action code based, at least in part, on the text message, the text phone number 131, 132, 139 called by the first user 150, the first user phone number or some combination thereof. (Step 210) The text service 130 may support one or more text phone numbers 131, 132, 139. As a non-limiting example, if the text service 130 supports 10 text phone numbers 131, 132, 139, each of the 10 text phone numbers 131, 132, 139 may be used to represent a different command, e.g. the first text phone number 131 may represent command 1 (change a price), the second text phone number 132 may represent command 2 (start a new ad campaign) and so on for any number of desired text phone numbers 131, 132, 139.

In addition, the text phone numbers 131, 132, 139 may be shared by one or more users 150, 160. In one embodiment, a text message sent to a first text phone number 131 may represent one action code (command 1) when sent from a first user phone number 152 and may represent a second different action code (command 2) when sent from a second user phone number 162. This embodiment would allow the text phone numbers 131, 132, 139 to be shared by all the users 150, 160 of the text service 130 and yet, at the same time, be customized for each user 150, 160.

The text service 130 may transmit the action code to one or more hosting servers 110, wherein the action code is used to alter a first website 111. (Step 220) In preferred embodiments, the first website 111 may have a first plugin 115. The first plugin 115 may be a widget and/or computer code associated with the first website 111. The first plugin 115 may receive the action code and update the content of the first website 111 based on the action code, which may be an alpha-numeric character sting.

As specific non-limiting examples, the action code may be used to alter the first website 111 by changing/adding/deleting a message, changing/adding/deleting a price, changing a template, changing/adding/deleting a graphic, blogging, performing customer service or support and/or changing/adding/deleting a promotion. In certain embodiments, the action code may be specific to the business operated from the first website 111 or may be in a standard format used by a plurality of websites 111, 112. The altered website 111 may be published on the one or more hosting servers 110. (Step 230)

Figure 3:
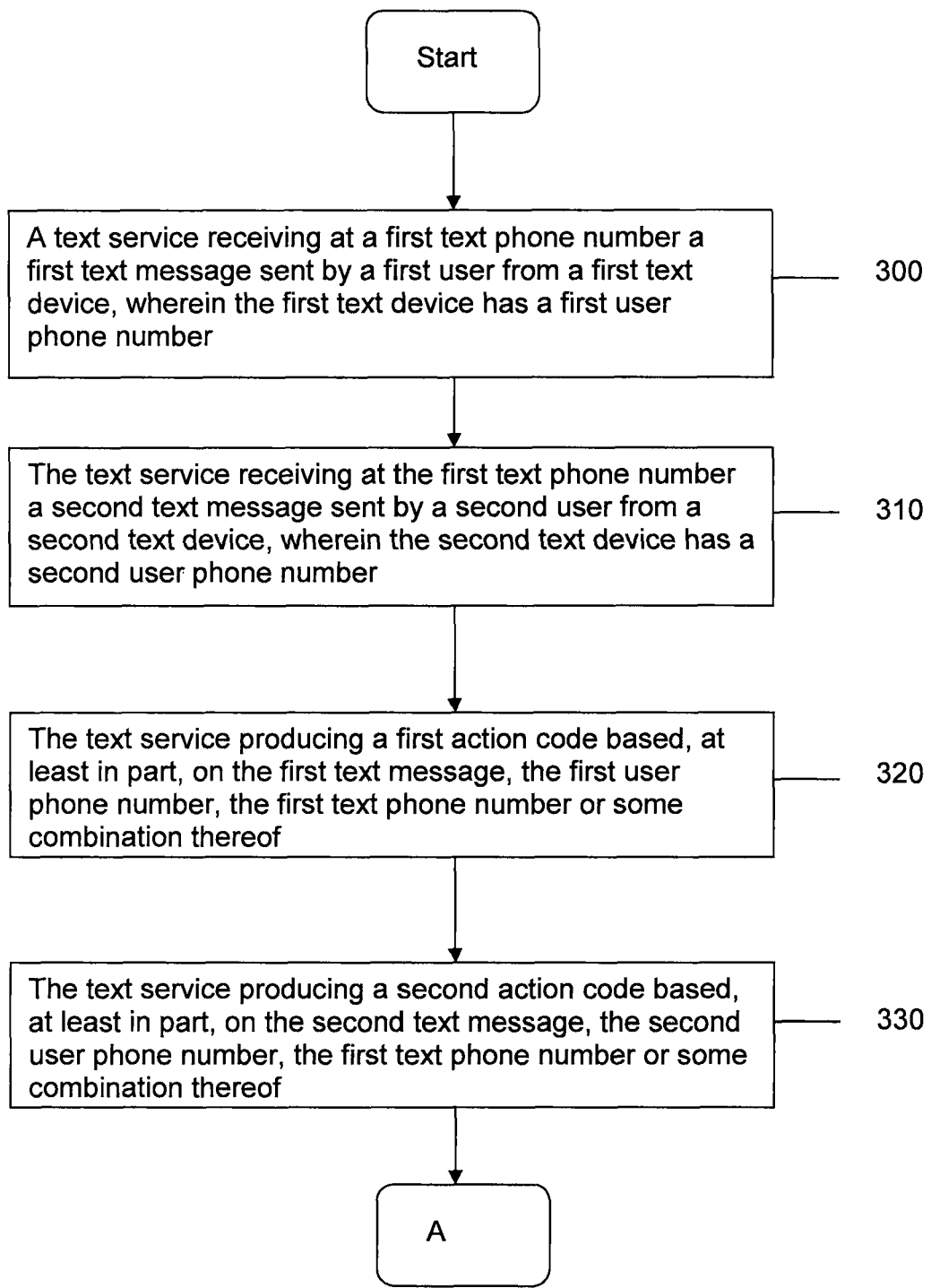
FIGS. 3 and 4 are flow diagrams illustrating a second embodiment of a plurality of users modifying a plurality of websites based on a plurality of text messages sent to the text service.
Figure 4:
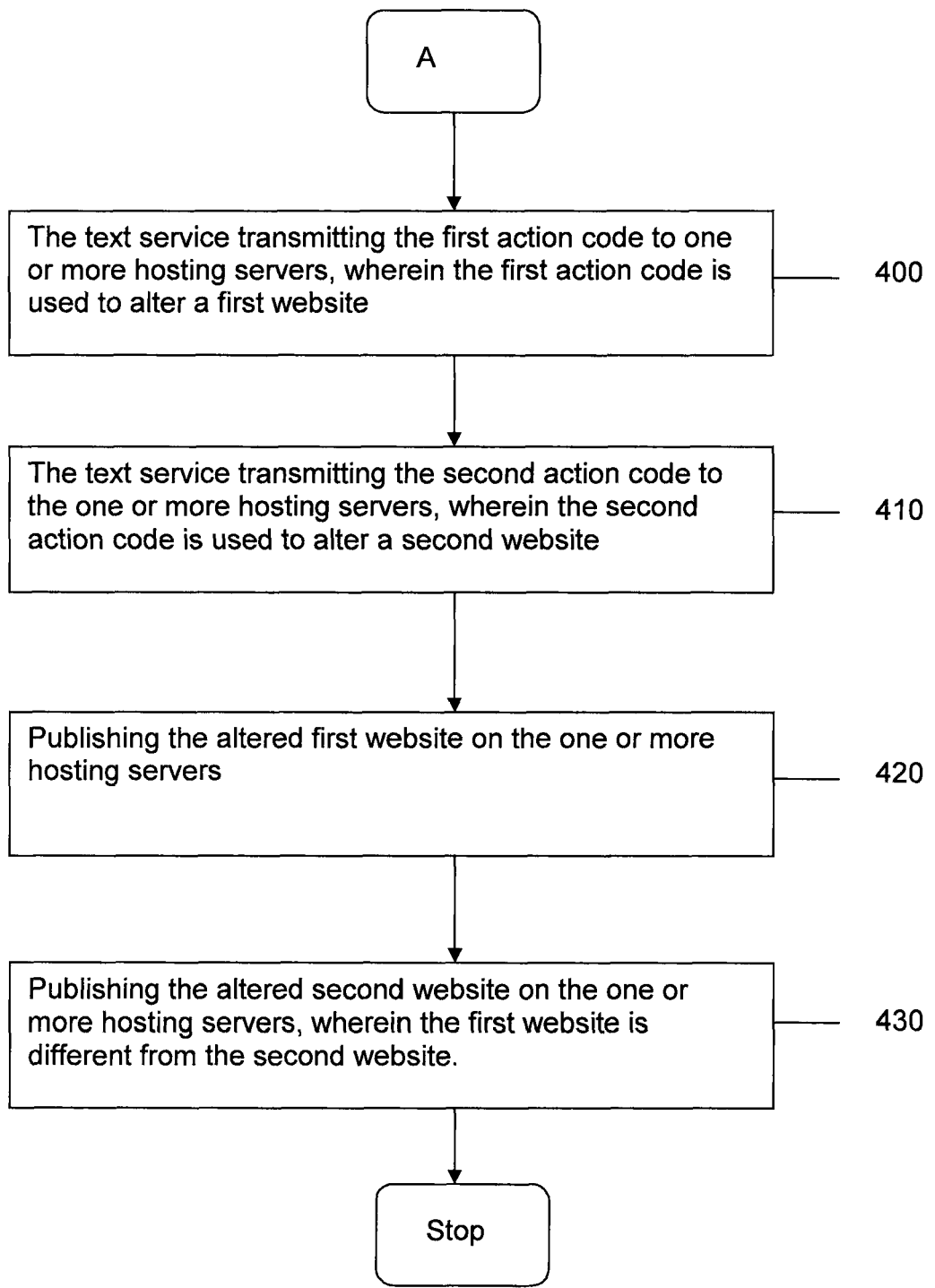

FIG. 3 and FIG. 4 illustrate another possible embodiment for practicing the invention. This embodiment illustrates that the invention may be practiced by a plurality of users 150, 160 during the same time period. The method may start with the text service 130, running on one or more hardware servers 101, receiving over a network 140 a first text message sent to a first text phone number 131 from a first text device 151 by a first user 150, wherein the first text device 151 may have a first user phone number 152. (Step 300) The text service 130 may also receive over the network 140 a second text message sent to the first text phone number 131 from a second text device 161 by a second user 160, wherein the second text device 161 may have a second user phone number 162. (Step 310) The first text message may be the same or different from the second text message.

In a preferred embodiment, the first text phone number 131 is merely one text phone number 131 in a plural of text phone numbers 131, 132, 139 that may be called by a plurality of users 150, 160. In other embodiments, each text phone number, in the plurality of text phone numbers 131, 132, 139, may be used to produce a different action code when called by a text device 151, 161.

The text service 130 may produce a first action code based, at least in part, on the first text message, the first text phone number 131, the first user phone number 152 or some combination thereof. (Step 320) In a similar manner, the text service 131 may produce a second action code based, at least in part, on the second text message, the first text phone number 131, the second user phone number 162 or some combination thereof. (Step 330) The first action code may be the same or different from the second action code. In preferred embodiments, the text service 130 may determine the first website 111 (or an identity of the first user 150 or an account associated with the first user 150) out of a plurality of websites 111, 112 hosted on the one or more hosting servers 110, based on the first user phone number 152 and/or text message. Likewise the text service 130 may determine the second website 112 (or an identity of the second user 160 or an account associated with the second user 160) out of the plurality of websites 111, 112 hosted on the one or more hosting servers 110, based on the second user phone number 162 and/or text message.

The text service 130 may transmit the first action code to one or more hosting servers 110, wherein the first action code is used to alter a first website 111. (Step 400) The text service 130 may transmit the second action code to the one or more hosting servers 110, wherein the second action code is used to alter a second website 112. (Step 410) Transmitting the first and second action codes through the hardware servers 101 to the first or second websites 111, 112, the first or second website code 113, 114 or the first or second plugin or widget 115, 116 may be accomplished using any protocol, communication technique or technology currently known or developed in the future. Software on the hosting servers 110, website code 113, 114, text service 130, plugin 115, 116 may be used to alter the website 111, 112 based on the action code (which may be the same or similar to the text message in simplified embodiments). The alteration may include, as non-limiting examples, the appearance of the website 111, 112 (such as a price listing, image, content, text coloring or size, template used, ads, promotions, etc.) or a management feature (such as the amount of bandwidth allowed, hosting technology used, software packages enables, widgets or plugins used by the website 111, 112, etc.).

After the first and second websites 111, 112 have been altered, the first and second websites 111, 112 may be published on one or more hosting servers 101. The altered websites 111, 112 may be published either automatically after sending the text messages or after a confirmation from the first user 150 for the first website 111 and a confirmation from the second user 160 for the second website 112. (Step 420) In other embodiments, the altered website 111, 112 does not need to be (re)published. For example, if the action code updated a database (such as a price for an item) the change could go live by design in real-time without having to (re)publish the website 111, 112.

In some embodiments, the same text message may produce different action codes and/or different alterations to the first website 111 and the second website 112. This may be possible if the text service 130 allows one or more users 150, 160 to define different commands to the same text message. As an example, a text message of "1", received from the first text device 151 having the first phone number, may initiate or trigger a new ad campaign on the first website 111 while the same text message of "1", received from the second text device 161 having the second user phone number, may lower all prices on the second website 112 by 10%. (Step 430) In other embodiments, the text messages may be made standard, so that all users 150, 160 that send in the same text message, such as "1", will have the same alterations made to their websites 111, 112. A hybrid system allowing both custom and standard text messages is also contemplated by the invention. In addition, one or more website alterations may be conveyed by a single text message and any number of text messages may be sent to the text service 130 as desired.

Figure 5:
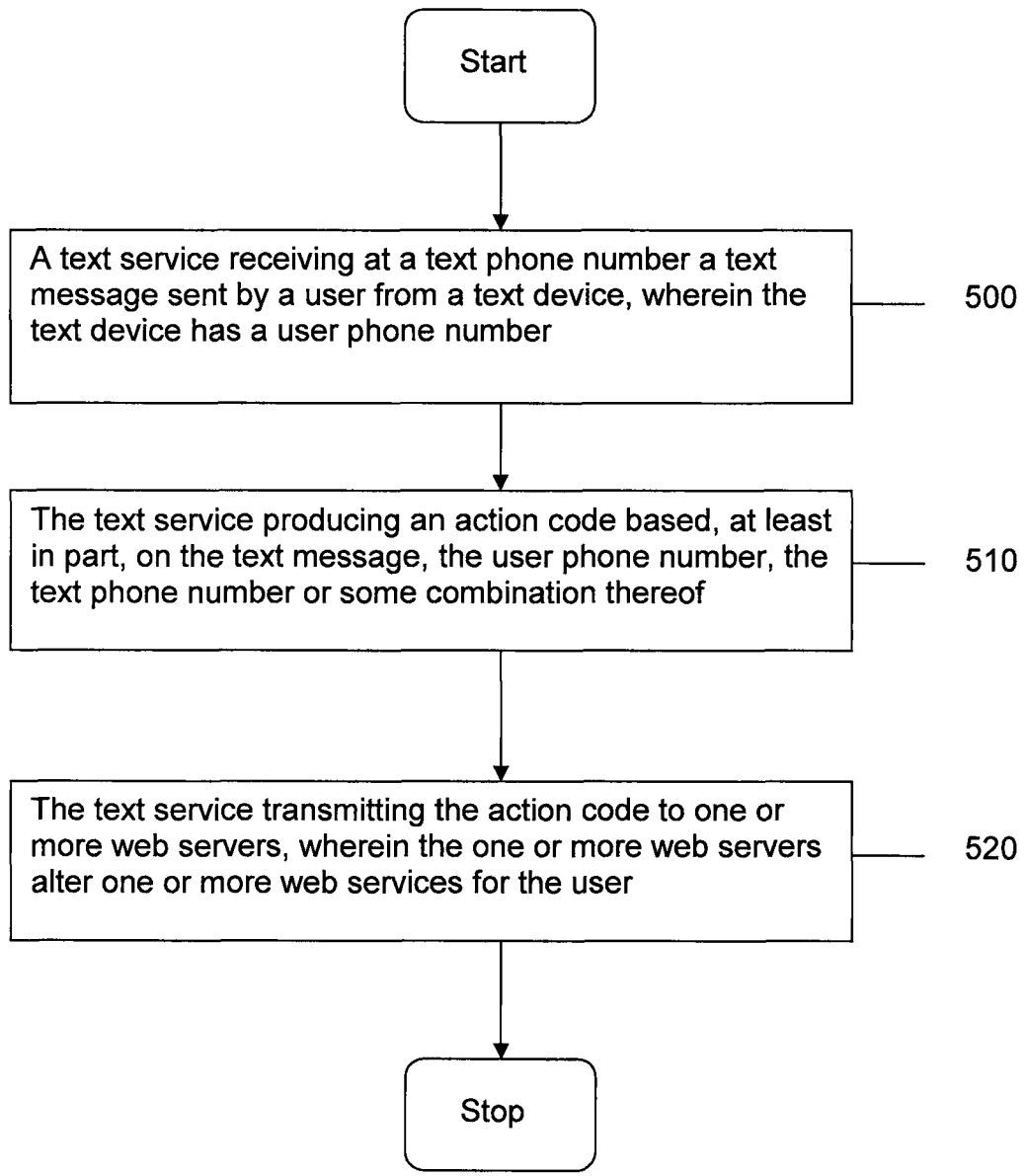
FIG. 5 is a flow diagram illustrating a third embodiment of a user modifying a web service based on a text message sent to a text service.

Another embodiment is illustrated in FIG. 5. As described for other embodiments, a text service 130, running on one or more hardware servers 101, may receive over a network 140 a text message sent to a first text phone number 131 from a first text device 151 by a first user 150, wherein the first text device 151 may have a first user phone number 152. (Step 500)

The text service 130 may comprise a plurality of text phone numbers 131, 132, 139. The text service 130 may produce, for each text phone number, in a plurality of text phone numbers 131, 132, 139, the same action code (if a standard method is being used) or a different action code (if a custom method is being used) when receiving a text message from a text device 151, 161.

The text service 130 may produce an action code based, at least in part, on the text message, the first text phone number 131, the first user phone number and/or some combination thereof. (Step 510) The text service 130 may determine an account of the user 150, in a plurality of users, based on the first user phone number 152.

The text service 130 may transmit the action code to, as a non-limiting example, an exposed API on one or more web servers 120, wherein the one or more web servers 120 may alter one or more web services. (Step 520)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
    hosting a website configured to be altered by a first text message, a second text message and a third text message sent by an owner of the website from a text device having a user phone number, wherein a text service determines the website to be altered out of a plurality of websites based on the user phone number;
    receiving the first text message at a text phone number of the text service running on one or more hardware servers sent by the owner of the website from the text device;

producing, on the one or more hardware servers, a first action code comprising an alpha-numeric string based, at least in part, on the first text message;

transmitting, by the one or more hardware servers, the first action code to one or more hosting servers, wherein the first action code is used to alter the website by changing a template of the website;

receiving the second text message at the text phone number of the text service running on one or more hardware servers sent by the owner of the website from the text device;

producing, on the one or more hardware servers, a second action code comprising an alpha-numeric string based, at least in part, on the second text message;

transmitting, by the one or more hardware servers, the second action code to one or more hosting servers, wherein the second action code is used to alter the website by changing a price of a good or service offered on the website;

receiving the third text message at the text phone number of the text service running on one or more hardware servers sent by the owner of the website from the text device;

producing, on the one or more hardware servers, a third action code comprising an alpha-numeric string based, at least in part, on the third text message; and transmitting, by the one or more hardware servers, the third action code to one or more hosting servers, wherein the third action code is used to alter the website by changing an amount of bandwidth allowed, a hosting technology used, a software package enabled or a widget or a plugin used by the website.

2. The method of claim 1, further comprising the step of: publishing the altered website on the one or more hosting servers.

3. The method of claim 1, further comprising the step of producing, on the one or more hardware servers, the first action code based, at least in part, on the first text message and the user phone number.

4. The method of claim 1, further comprising the step of producing, on the one or more hardware servers, the first action code based, at least in part, on the first text message and the text phone number.

5. The method of claim 2, further comprising the steps of: the one or more hosting servers transmitting the first action code to a plugin for the website; and
the plugin altering the website based on the first action code.

6. The method of claim 1, wherein the received first text message is in a Short Message Service format or a Multimedia Messaging Service format.

7. The method of claim 1, wherein the text phone number is included in a plurality of text phone numbers operated on the one or more hardware servers.

8. A method, comprising the steps of:
hosting a first website configured to be altered by a first text message, a third text message and a fifth text message sent by an owner of the first website from a first text device having a first user phone number, wherein a text service determines the first website to be altered out of a plurality of websites based on the first user phone number and hosting a second website configured to be altered by a second text message, a fourth text message and a sixth text message sent by an owner of the second website from a second text device having a second user phone number, wherein the text service determines the second website to be altered out of a plurality of websites based on the second user phone number;

receiving the first text message at the first text phone number of the text service running on one or more hardware servers sent by the owner of the first website from the first text device;

receiving the second text message at the first text phone number of the text service running on the one or more hardware servers sent by the owner of the second website from the second text device;

producing, on the one or more hardware servers, a first action code comprising a first alpha-numeric string based, at least in part, on the first text message;

producing, on the one or more hardware servers, a second action code comprising a second alpha-numeric string based, at least in part, on the second text message, wherein the first action code is the same as the second action code;

transmitting, by the one or more hardware servers, the first action code to one or more hosting servers, wherein the first action code is used to alter the first website by changing a first price of a first good or service; and transmitting, by the one or more hardware servers, the second action code to the one or more hosting servers, wherein the second action code is used to alter the second website by changing a second price of a second good or service;

receiving the third text message at the first text phone number of the text service running on one or more hardware servers sent by the owner of the first website from the first text device;

receiving the fourth text message at the first text phone number of the text service running on the one or more hardware servers sent by the owner of the second website from the second text device;

producing, on the one or more hardware servers, a third action code comprising a third alpha-numeric string based, at least in part, on the third text message;

producing, on the one or more hardware servers, a fourth action code comprising a fourth alpha-numeric string based, at least in part, on the fourth text message, wherein the third action code is the same as the fourth action code;

transmitting, by the one or more hardware servers, the third action code to one or more hosting servers, wherein the third action code is used to alter the first website by changing a first template of the first website;

transmitting, by the one or more hardware servers, the fourth action code to the one or more hosting servers, wherein the fourth action code is used to alter the second website by changing a second template of the second website;

receiving the fifth text message at the first text phone number of the text service running on one or more hardware servers sent by the owner of the first website from the first text device;

receiving the sixth text message at the first text phone number of the text service running on the one or more hardware servers sent by the owner of the second website from the second text device;

producing, on the one or more hardware servers, a fifth action code comprising a fifth alpha-numeric string based, at least in part, on the fifth text message;

producing, on the one or more hardware servers, a sixth action code comprising a sixth alpha-numeric string based, at least in part, on the sixth text message, wherein the fifth action code is the same as the sixth action code;

transmitting, by the one or more hardware servers, the fifth action code to one or more hosting servers, wherein the fifth action code is used to alter the first website by changing an amount of bandwidth allowed, a hosting technology used, a software package enabled or a widget or a plugin used by the first website; and transmitting, by the one or more hardware servers, the sixth action code to the one or more hosting servers, wherein the sixth action code is used to alter the second website by changing an amount of bandwidth allowed, a hosting technology used, a software package enabled or a widget or a plugin used by the second website.

9. The method of claim 8, further comprising the steps of:
publishing the altered first website on the one or more hosting servers; and
publishing the altered second website on the one or more hosting servers, wherein the first website is different from the second website.

10. The method of claim 8, further comprising the step of producing, on the one or more hardware servers, the first action code based, at least in part, on the first text message and the first user phone number.

11. The method of claim 8, further comprising the step of producing, on the one or more hardware servers, the first action code based, at least in part, on the first text message and the first text phone number, wherein the first text phone number is in a plurality of text phone numbers.

12. The method of claim 8,
the one or more hosting servers transmitting the first action code to a first plugin for the first website;
the one or more hosting servers transmitting the second action code to a second plugin for the second website;
the first plugin altering the first website based on the first action code; and
the second plugin altering the second website based on the second action code.

13. The method of claim 8, wherein the received first text message is in a Short Message Service format or a Multimedia Messaging Service format.

14. The method of claim 8, wherein the first text phone number is included in a plurality of text phone numbers operated on the one or more hardware servers.

15. A method, comprising the steps of:
providing one or more web services configured to be altered by a first text message, a second text message and a third text message sent by an owner of the one or more web services from a text device having a user phone number, wherein a text service determines the one or more web services based on the user phone number;
receiving the first text message at a text phone number of the text service running on one or more hardware servers sent by the owner of the web services from the text device;
producing, on the one or more hardware servers, a first action code comprising an alpha-numeric string based, at least in part, on the first text message; and
transmitting, on the one or more hardware servers, the first action code to one or more web servers, wherein the one or more web servers alter the one or more web services based on the action code and the one or more web services comprise domain name registration services;

receiving the second text message at the text phone number of the text service running on the one or more hardware servers sent by the owner of the web services from the text device;

producing, on the one or more hardware servers, a second action code comprising an alpha-numeric string based, at least in part, on the second text message;

transmitting, on the one or more hardware servers, the second action code to the one or more web servers, wherein the one or more web servers alter the one or more web services based on the action code and the one or more web services comprise an ability to purchase and install a Secure Socket Layer (SSL) certificate for a website;

receiving the third text message at the text phone number of the text service running on the one or more hardware servers sent by the owner of the web services from the text device;

producing, on the one or more hardware servers, a third action code comprising an alpha-numeric string based, at least in part, on the third text message; and transmitting, on the one or more hardware servers, the third action code to the one or more web servers, wherein the one or more web servers alter the one or more web services based on the action code and the one or more web services include domain name searches.

16. The method of claim 15, further comprising the step of producing, on the one or more hardware servers, the first action code based, at least in part, on the first text message and the user phone number.

17. The method of claim 15, further comprising the step of producing, on the one or more hardware servers, the first action code based, at least in part, on the first text message and the text phone number.

18. The method of claim 15, further comprising the step of determining, on the one or more hardware servers, an account of the user, in a plurality of users, based on the user phone number.

19. The method of claim 15, wherein the received first text message is in a Short Message Service format or a Multimedia Messaging Service format.

20. The method of claim 15, wherein the text phone number is included in a plurality of text phone numbers operated on the one or more hardware servers.

21. The method of claim 15, wherein the one or more web services comprise an ability to register a domain name.

22. The method of claim 15, wherein the one or more web services comprise an ability to purchase and install a Secure Sockets Layer (SSL) certificate for a website.

23. The method of claim 15, wherein the action code is transmitted to an exposed API on the one or more web servers.

* * * * *